US008365378B1

(12) United States Patent
Lenart

(10) Patent No.: US 8,365,378 B1
(45) Date of Patent: Feb. 5, 2013

(54) MOLDING REMOVAL TOOL ASSEMBLY

(76) Inventor: Edward Lenart, Farmington Hills, MI (US)

( * ) Notice: Subject to any disclaimer, the term of this patent is extended or adjusted under 35 U.S.C. 154(b) by 420 days.

(21) Appl. No.: 12/721,718

(22) Filed: Mar. 11, 2010

(51) Int. Cl.

| | |
|---|---|
| ***B25B 27/14*** | (2006.01) |
| ***B25B 1/00*** | (2006.01) |
| ***B23P 19/04*** | (2006.01) |
| ***A47L 11/00*** | (2006.01) |
| ***A47L 17/06*** | (2006.01) |
| ***A01K 31/04*** | (2006.01) |
| ***A01B 1/00*** | (2006.01) |
| ***B67B 7/00*** | (2006.01) |

(52) U.S. Cl. ................ 29/253; 29/278; 29/244; 29/271; 15/50.1; 15/93.1; 15/236.01; 254/25; 269/3; 269/6; 7/116; 81/3.08; 81/3.5

(58) Field of Classification Search .................... 29/253, 29/244, 271, 278; 15/50.1, 93.1, 236.01; 254/25; 269/3, 6; 7/116; 81/3.08–3.5
See application file for complete search history.

(56) References Cited

U.S. PATENT DOCUMENTS

| | | | | |
|---|---|---|---|---|
| 3,587,121 | A | 6/1971 | Morrow | |
| 4,213,215 | A * | 7/1980 | Hall | 7/152 |
| 4,463,631 | A * | 8/1984 | Barnes et al. | 81/3.09 |
| 4,745,651 | A | 5/1988 | Schellenger | |
| 5,447,289 | A | 9/1995 | Callahan | |
| 5,695,171 | A | 12/1997 | Shine | |
| 5,695,172 | A | 12/1997 | Hreha | |
| 6,618,894 | B2 * | 9/2003 | Josdal | 15/236.06 |
| 6,786,472 | B1 | 9/2004 | Dahl | |
| 6,994,322 | B1 * | 2/2006 | Wittman | 254/131 |
| D567,052 | S | 4/2008 | Vandenberghe | |
| 7,814,608 | B1 * | 10/2010 | Catello | 15/236.01 |
| 7,900,329 | B2 * | 3/2011 | Chun | 29/278 |
| 2008/0217592 | A1 | 9/2008 | Chambers | |

* cited by examiner

*Primary Examiner* — Monica Carter
*Assistant Examiner* — Nirvana Deonauth

(57) ABSTRACT

A molding removal tool assembly includes a handle having a first end and a second end. A plate is attached to the second end. The plate has a distal edge with respect to the handle. A blade is attached to the distal edge. The blade has a first side, a second side and a free edge. The blade has an opening therein extending into the first side and outwardly of the second side. The opening has a bottom edge. A tab is attached to the bottom edge and is angled toward the handle so that the plate extends over the tab. The free edge is configured to be extended between a wall surface and molding attached to the wall surface to urge the molding off of the wall surface with the tab.

15 Claims, 4 Drawing Sheets

MOLDING REMOVAL TOOL ASSEMBLY

BACKGROUND OF THE DISCLOSURE

Field of the Disclosure

The disclosure relates to trim removal tools and more particularly pertains to a new trim removal tool for assisting a person in removing molding, including wall trim, door trim and baseboards from a wall surface.

SUMMARY OF THE DISCLOSURE

An embodiment of the disclosure meets the needs presented above by generally comprising a handle having a first end and a second end. A plate is attached to the second end and extends away therefrom. The plate has a distal edge positioned opposite of the handle. A blade is attached to and extends downwardly from the distal edge. The blade has a first side, a second side and a free edge distal to the plate. The blade has an opening therein extending into the first side and outwardly of the second side. The second side faces the handle. The opening has a bottom edge, a top edge and a pair of lateral edges. The bottom edge is further from the plate than the top edge. A tab is attached to the bottom edge and is angled toward the handle so that the plate extends over the tab. The free edge is configured to be extended between a wall surface and molding attached to the wall surface to urge the molding off of the wall surface with the tab.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
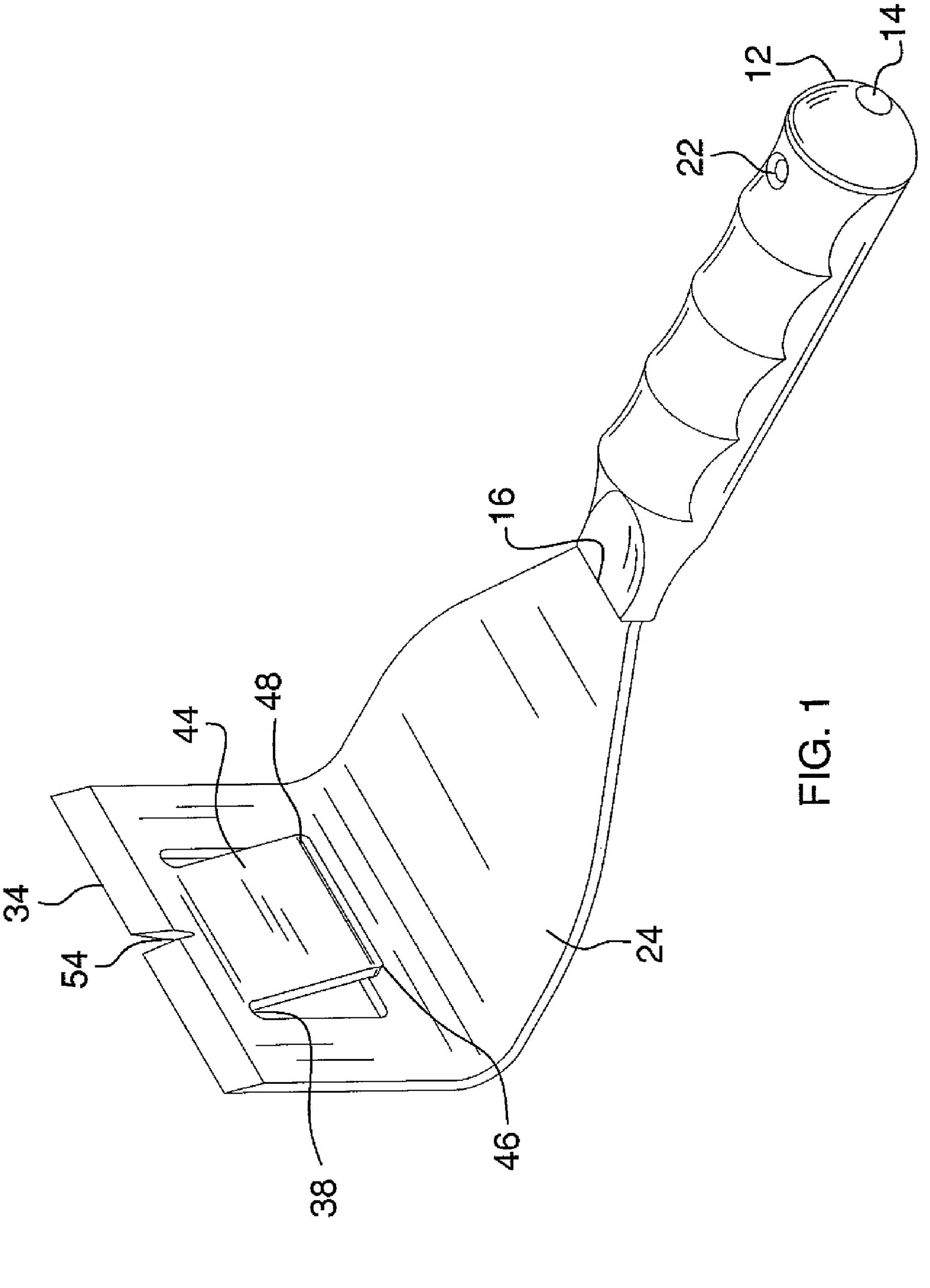
FIG. 1 is a bottom perspective view of a molding removal tool assembly according to an embodiment of the disclosure.
Figure 2:
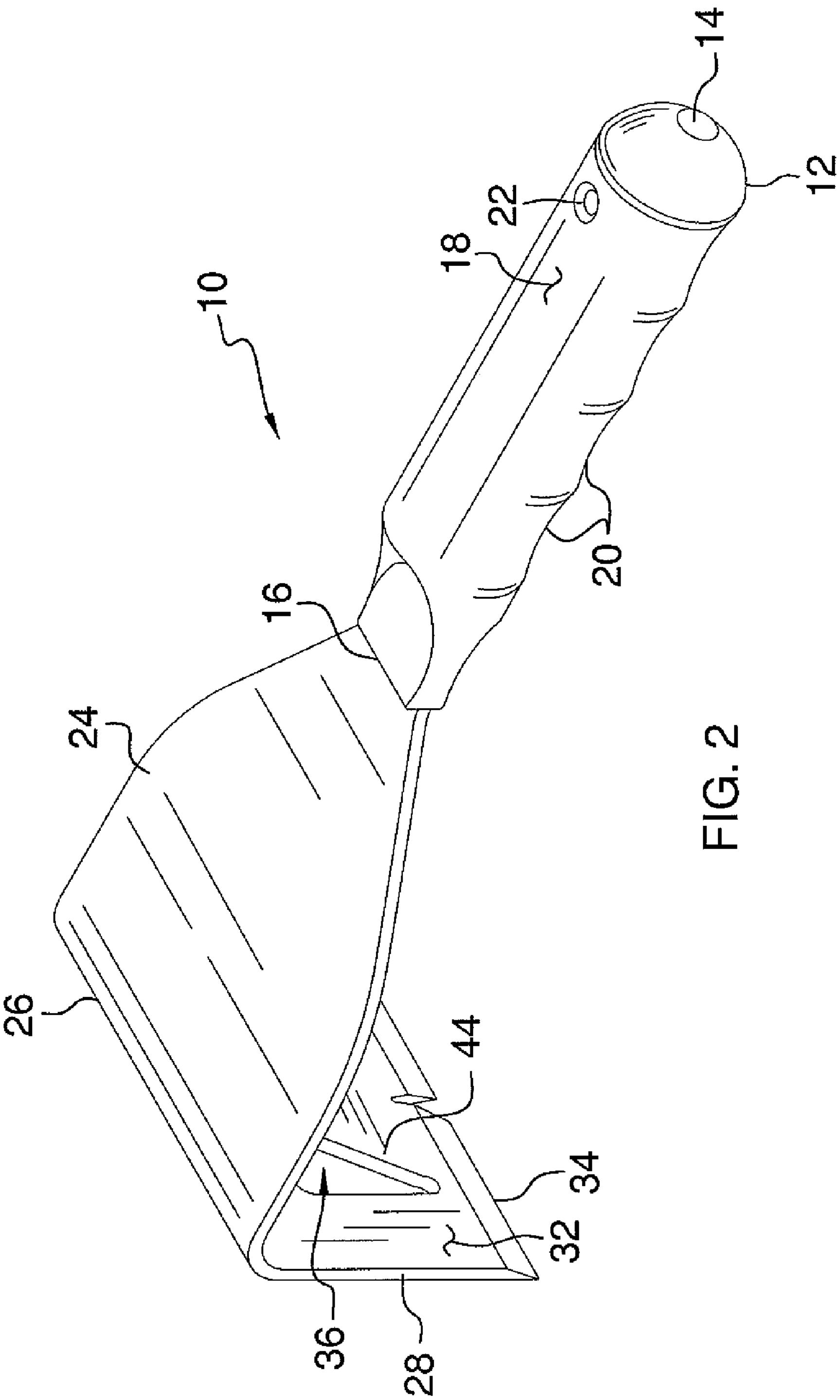
FIG. 2 is a top perspective view of an embodiment of the disclosure.
Figure 3:
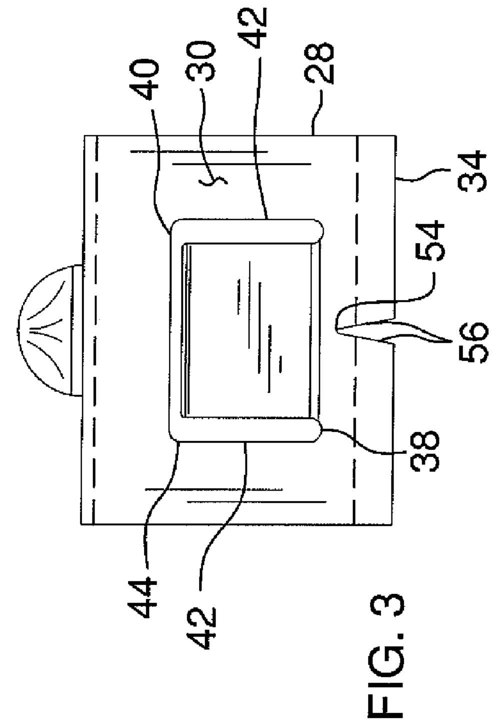
FIG. 3 is a front view of an embodiment of the disclosure.
Figure 4:
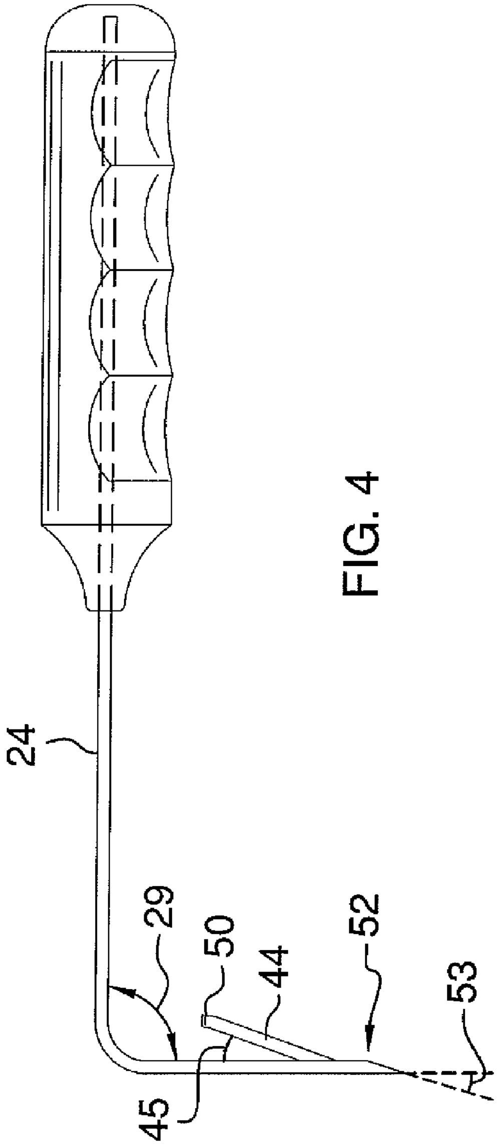
FIG. 4 is a side view of an embodiment of the disclosure.

With reference now to the drawings, and in particular to FIGS. 1 through 5 thereof, a new trim removal tool embodying the principles and concepts of an embodiment of the disclosure and generally designated by the reference numeral 10 will be described.

As best illustrated in FIGS. 1 through 5, the molding removal tool assembly 10 generally comprises a handle 12 that has a first end 14 and a second end 16. A perimeter surface 18 is defined from the first end 14 to the second end 16. The perimeter surface 18 has a plurality of finger grips 20 therein. The handle 12 has an aperture 22 extending therethrough nearer to the first end than the second end. The handle 12 has a length from the first end to the second end between 100 mm and 200 mm.

A plate 24 is attached to the second end 16 and extends away therefrom. The plate 24 has a distal edge 26 positioned opposite of the handle 12. The distal edge 26 has a width between 50 mm and 150 mm. A blade 28 is attached to and extends downwardly from the distal edge 26. The blade 28 forms an angle 29 between 80° and 100° with the plate 24. The blade 26 has a first side 30, a second side 32 and a free edge 34 distal to the plate 24. The blade 28 has an opening 36 therein extending into the first side 30 and outwardly of the second side 32. The second side 32 faces the handle 12. The opening 36 has a bottom edge 38, a top edge 40 and a pair of lateral edges 42. The bottom edge 38 is further from the plate 24 than the top edge 40.

A tab 44 is attached to the bottom edge 38 and is angled toward the handle 12 so that the plate 24 extends over the tab 44. The tab 44 forms an angle 45 with the second side 32 between 15° and 25°. The blade 28 has a height from the plate 24 to the free edge 34 between 50 mm and 120 mm. The bottom edge 38 is spaced from the free edge 34 between 15 mm and 30 mm and the upper edge 44 is spaced from the bottom edge 38 between 25 mm and 60 mm. A distance between lateral edges 42 of the opening 36 is between 40 mm and 80 mm. The free edge 34 has a width approximately equal to the width of the distal edge 26.

The tab 44 extends upwardly from the bottom edge 38 a distance of between 25 mm and 50 mm. The tab 44 has proximal edge 46 with respect to the plate 24. The proximal edge 46 is positioned between 10 mm and 20 mm from the second side 32 of the blade 28. The tab 44 may have a bend 48 therein positioned nearer to proximal edge 46 than the bottom edge 38 of the opening 36. An upper portion of the tab 44 is defined between the bend 48 and the proximal edge 46 that has an outer surface 50 facing the handle 12 which lies in a plane orientated approximately parallel to the first side 30 of the blade 28. The tab 44, plate 24 and blade 28 are comprised of a rigid material such as a metallic material which will allow the tab 44 to be resiliently bendable to act as a spring biasing objects away from the second side 32 of the blade 28.

A bottom section 52 of the blade 28 is defined that includes the free edge 34 and is positioned between the opening 36 and the free edge 34. The second side 32 of the bottom section 52 is angled toward the first side 30 so that the bottom section 52 tapers to a point. The second side 32 of the bottom section 52 is forms an angle 53 between 15° and 20° with respect to the first side 30 of the bottom section 52.

The free edge 34 has a notch 54 therein. The notch 54 is centrally located on the free edge 34 and extends upwardly toward the opening 36. The notch 54 extends upwardly from the free edge 34 a distance of between 5 mm and 20 mm and has a pair of side edges 56 forming an angle between 15° and 20°. The notch 54 may be used for removing fasteners, such as nails, from wood.

Figure 5:
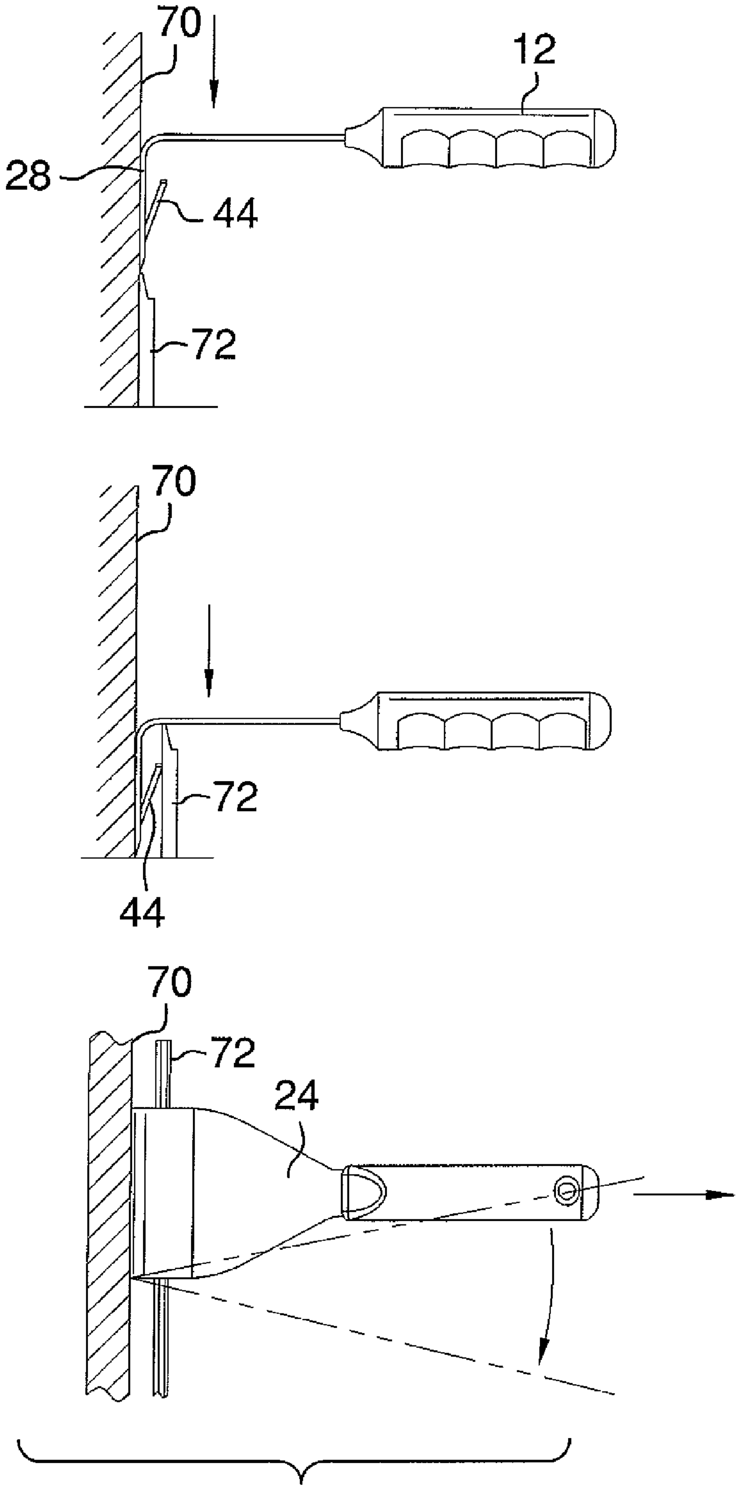
FIG. 5 is a side in-use view of an embodiment of the disclosure.

In use, the free edge 34 is configured to be extended between a wall surface 70 and molding 72 attached to the wall surface 70 to urge the molding 72 off of the wall surface 70 with the tab 44. The term molding 72 may be expanded to include any type of wall trimming including ceiling trim, window trim, door trim, baseboards and the like. In particular, the free edge 34 is abutted against the juncture of the wall surface 70 and molding 72 so that that the first side 30 also abuts the walls surface 70. The plate 24 may then be struck, such as with a hammer, to drive the blade 28 between the molding 72 and the wall surface 70. The tab 44 urges the molding 72 away from the wall surface 70. Once the molding 72 is separated, the handle 12 may be manipulated vertically or laterally and the handle 12 pulled away from the wall surface 70 as is shown in FIG. 5.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A molding removal tool assembly configured to assist a person in prying molding off of a wall surface, said assembly comprising:

- a handle having a first end and a second end;
- a plate being attached to said second end and extending away therefrom, said plate having a distal edge positioned opposite of said handle;
- a blade being attached to and extending downwardly from said distal edge, said blade having a first side, a second side and a free edge distal to said plate, said blade having an opening therein extending into said first side and outwardly of said second side, said second side facing said handle, said opening having a bottom edge, a top edge and a pair of lateral edges, said bottom edge being further from said plate than said top edge;
- a single planar tab attached to said blade, said tab being attached to said bottom edge and being angled toward said handle and said plate such that said plate extends over said tab; and
- wherein said free edge is configured to be extended between a wall surface and molding attached to the wall surface to urge the molding off of the wall surface with said tab.

2. The assembly according to claim 1, wherein said handle includes a perimeter surface being defined from said first end to said second end, said perimeter surface having a plurality of finger grips therein.

3. The assembly according to claim 1, wherein said distal edge of said plate has a width between 50 mm and 150 mm.

4. The assembly according to claim 1, wherein said blade forms an angle between 80° and 100° with said plate.

5. The assembly according to claim 4, wherein said tab forms an angle with said second side between 15° and 25°.

6. The assembly according to claim 5, said blade having a height from said plate to said free edge between 50 mm and 120 mm, said bottom edge being spaced from said free edge between 15 mm and 30 mm, said upper edge being spaced from said bottom edge between 25 mm and 60 mm, a distance between lateral edges of said opening being between 40 mm and 80 mm.

7. The assembly according to claim 5, wherein said tab extends upwardly from said bottom edge a distance of between 25 mm and 50 mm.

8. The assembly according to claim 1, wherein said tab has a proximal edge with respect to said plate, said proximal edge being positioned between 10 mm and 20 mm from said second side of said blade.

9. The assembly according to claim 1, further including a bottom section of said blade being defined including said free edge and being positioned between said opening and said free edge, said second side of said bottom section being angled toward said first side such that said bottom section tapers to a point.

10. The assembly according to claim 9, wherein aid said second side of said bottom section being angled between 15° and 20° with respect to said first side of said bottom section.

11. The assembly according to claim 9, wherein said tab has proximal edge with respect to said plate, said proximal edge being positioned between 10 mm and 20 mm from said second side of said blade.

12. The assembly according to claim 8, wherein said free edge has a notch therein, said notch being centrally located on said free edge and extending upwardly toward said opening, said notch extending upwardly from said free edge a distance of between 5 mm and 20 mm, said notch having a pair of side edges forming an angle between 15° and 20°.

13. The assembly according to claim 1, wherein said free edge has a notch therein, said notch being centrally located on said free edge and extending upwardly toward said opening, said notch extending upwardly from said free edge a distance of between 5 mm and 20 mm, said notch having a pair of side edges forming an angle between 15° and 20°.

14. The assembly according to claim 8, wherein said tab has a bend therein positioned nearer to proximal edge than said bottom edge of said opening, an upper portion of said tab being defined between said bend and said proximal edge, said upper portion having an outer surface facing said handle, said outer surface lying in a plane orientated approximately parallel to said first side of said blade.

15. A molding removal tool assembly configured to assist a person in prying molding off of a wall surface, said assembly comprising:

- a handle having a first end and a second end, a perimeter surface being defined from said first end to said second end, said perimeter surface having a plurality of finger grips therein, said handle having an aperture extending therethrough nearer to said first end than said second end, said handle having a length from said first end to said second end between 100 mm and 200 mm;
- a plate being attached to said second end and extending away therefrom, said plate having a distal edge positioned opposite of said handle, said distal edge having a width between 50 mm and 150 mm;
- a blade being attached to and extending downwardly from said distal edge, said blade forming an angle between 80° and 100° with said plate, said blade having a first side, a second side and a free edge distal to said plate, said blade having an opening therein extending into said first side and outwardly of said second side, said second side facing said handle, said opening having a bottom edge, a top edge and a pair of lateral edges, said bottom edge being further from said plate than said top edge;
- a tab being attached to said bottom edge and being angled toward said handle such that said plate extends over said tab, said tab forming an angle with said second side between 15° and 25°, said blade having a height from said plate to said free edge between 50 mm and 120 mm, said bottom edge being spaced from said free edge between 15 mm and 30 mm, said upper edge being spaced from said bottom edge between 25 mm and 60 mm, a distance between lateral edges of said opening being between 40 mm and 80 mm, said free edge having a width approximately equal to said width of said distal edge;

said tab extending upwardly from said bottom edge a distance of between 25 mm and 50 mm, said tab having proximal edge with respect to said plate, said proximal edge being positioned between 10 mm and 20 mm from said second side of said blade, said tab having a bend therein positioned nearer to proximal edge than said bottom edge of said opening, an upper portion of said tab being defined between said bend and said proximal edge, said upper portion having an outer surface facing said handle, said outer surface lying in a plane orientated approximately parallel to said first side of said blade;

a bottom section of said blade being defined including said free edge and being positioned between said opening and said free edge, said second side of said bottom section being angled toward said first side such that said bottom section tapers to a point, said second side of said bottom section being angled between 15° and 20° with respect to said first side of said bottom section;

said free edge having a notch therein, said notch being centrally located on said free edge and extending upwardly toward said opening, said notch extending upwardly from said free edge a distance of between 5 mm and 20 mm, said notch having a pair of side edges forming an angle between 15° and 20°; and wherein said free edge is configured to be extended between a wall surface and molding attached to the wall surface to urge the molding off of the wall surface with said tab.

* * * * *